(12) United States Patent
Fujii et al.

(10) Patent No.: US 8,964,290 B2
(45) Date of Patent: Feb. 24, 2015

(54) MICROSCOPE

(71) Applicant: Canon Kabushiki Kaisha, Tokyo (JP)

(72) Inventors: Hirofumi Fujii, Toyono-gun (JP);
Michio Yanagisawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 13/727,435

(22) Filed: Dec. 26, 2012

(65) Prior Publication Data

US 2013/0170025 A1 Jul. 4, 2013

(30) Foreign Application Priority Data

Dec. 28, 2011 (JP) ................................. 2011-287919

(51) Int. Cl.
*G02B 21/26* (2006.01)

(52) U.S. Cl.
CPC ..................................... *G02B 21/26* (2013.01)
USPC .......................................... 359/391; 359/393

(58) Field of Classification Search
USPC .................................................. 359/391, 393
See application file for complete search history.

(56) References Cited

U.S. PATENT DOCUMENTS

| | | | | |
|---|---|---|---|---|
| 5,280,677 | A * | 1/1994 | Kubo et al. | 33/568 |
| 5,323,712 | A * | 6/1994 | Kikuiri | 108/20 |
| 5,812,310 | A * | 9/1998 | Stewart et al. | 359/392 |
| 7,270,319 | B2 * | 9/2007 | Culpepper | 267/160 |
| 8,546,761 | B2 * | 10/2013 | Aeschbach | 250/339.11 |
| 2002/0131167 | A1 * | 9/2002 | Nguyen et al. | 359/394 |
| 2002/0163741 | A1 | 11/2002 | Shibazaki | |
| 2004/0066552 | A1 * | 4/2004 | Werba | 359/391 |
| 2011/0090563 | A1 * | 4/2011 | Krasov | 359/391 |
| 2011/0164316 | A1 * | 7/2011 | Kassen | 359/391 |

FOREIGN PATENT DOCUMENTS

| | | | |
|---|---|---|---|
| JP | 60-168118 | A | 8/1985 |
| JP | 6-123787 | A | 5/1994 |
| JP | 9-211337 | A | 8/1997 |
| JP | 11-136966 | A | 5/1999 |
| JP | 2000-75927 | A | 3/2000 |
| JP | 2000-98257 | A | 4/2000 |
| JP | 2002-131605 | A | 5/2002 |
| JP | 2002-165467 | A | 6/2002 |
| JP | 2010-515943 | A | 5/2010 |

* cited by examiner

*Primary Examiner* — Frank Font
(74) *Attorney, Agent, or Firm* — Canon USA Inc IP Division

(57) ABSTRACT

A microscope includes an illumination system, a stage, and an objective lens that forms an image of a specimen. The stage includes a fixed member whose position and inclination are fixed, a specimen holding member at least one of whose position and inclination is changeable, and a supporting member that supports the specimen holding member. A connection between the supporting member and the specimen holding member and a connection between the supporting member and the fixed member reside near sides of the specimen holding member. The microscope further includes an actuator that changes at least one of the position and the inclination of the specimen holding member with respect to the fixed member, and a buffer mechanism that suppresses transmission of any changes in the inclination of the specimen holding member to the actuator. The actuator and the specimen holding member are connected with the buffer mechanism interposed therebetween.

4 Claims, 5 Drawing Sheets

MICROSCOPE

BACKGROUND OF THE INVENTION

1. Field of the Invention

The present invention relates to a microscope used in observing an image of a specimen.

2. Description of the Related Art

It is known that doctors often diagnose diseases on the basis of image data on specimens (samples such as cells or tissues of the body) that is acquired through digital microscopes. Doctors are required to make diagnoses correctly and quickly. Hence, image data to be acquired through digital microscopes needs to be easy to make diagnoses. Furthermore, such image data needs to be quickly acquirable.

When the angle of view of a microscope defined by an objective lens is increased, the area of an image to be acquired at a time increases. This enables quick acquisition of image data but makes it difficult to acquire an image that is in focus at every point of the area defined by that angle of view. This is because each specimen is not flat and has undulations. Hence, the focal plane (a plane at the focal point) of the objective lens does not necessarily conform to the surface of the specimen to be observed.

Accordingly, a method may be employed in which a stage on which a specimen is to be placed is moved on the basis of measured undulations of the specimen and such that the focal plane of the objective lens conforms to the surface of the specimen, whereby at least one of the position and the inclination of the specimen with respect to the objective lens is changed.

Instead of a stage on which a specimen is to be placed, a parallel link mechanism is disclosed by Japanese Patent Laid-Open No. 2002-131605 in which an optical element, which is an object to be moved, is movable with respect to six axes.

The stage of a digital microscope is provided in a very narrow space between an illumination system that illuminates a specimen and an objective lens provided across the specimen from the illumination system. Therefore, even if the parallel link mechanism disclosed by Japanese Patent Laid-Open No. 2002-131605 is applied to the stage of a digital microscope, it is difficult to move the stage through a desired stroke in such a narrow space.

SUMMARY OF THE INVENTION

An embodiment of the present invention provides a microscope including a stage that is thin enough to be provided in a space between an illumination system and an objective lens and is movable through a desired stroke.

According to an aspect of the present invention, there is provided a microscope including an illumination system that illuminates a specimen, a stage on which the specimen is to be placed, and an objective lens that forms an image of the specimen illuminated by the illumination system. The stage includes a fixed member whose position and inclination with respect to the objective lens are fixed, a specimen holding member at least one of whose position and inclination with respect to the fixed member is changeable, and a supporting member that supports the specimen holding member with respect to the fixed member. A connection between the supporting member and the specimen holding member and a connection between the supporting member and the fixed member reside near sides of the specimen holding member. The microscope further includes an actuator that drives the specimen holding member such that at least one of the position and the inclination of the specimen holding member with respect to the fixed member is changed, and a buffer mechanism that suppresses transmission of any changes in the inclination of the specimen holding member that may occur with the driving by the actuator to the actuator. The actuator and the specimen holding member are connected to each other with the buffer mechanism interposed therebetween.

Further features of the present invention will become apparent from the following description of exemplary embodiments with reference to the attached drawings.

DESCRIPTION OF THE EMBODIMENTS

Figure 1:
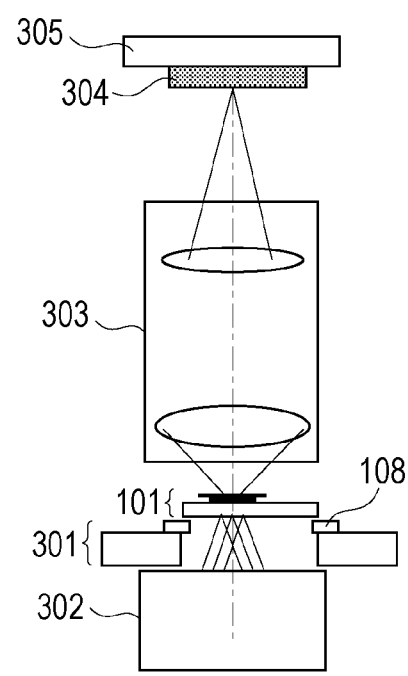
FIG. 1 is a schematic diagram of a digital microscope according to a general embodiment of the present invention.

A general embodiment of the present invention will now be described with reference to the attached drawings. FIG. 1 is a schematic diagram of a digital microscope according to the general embodiment.

Referring to FIG. 1, a preparation 101 includes a glass slide having a specimen (sample) pasted thereon with a cover slip provided over the specimen. The preparation 101, i.e., the specimen, is placed on a stage 301. The specimen is illuminated by an illumination system 302. Light from the illumination system 302 is transmitted through the specimen and enters an objective lens 303, where an image of the specimen is formed. An image pickup device 304 is supported by an image-pickup-device-supporting plate 305.

The stage 301 includes a driving mechanism that meets the following needs:
(1) To remove the preparation 101 from below the objective lens 303;
(2) To move the preparation 101 into an area defined by the angle of view of the objective lens 303; and
(3) To adjust the focus as optimally as possible over the entirety of the area defined by the angle of view of the objective lens 303.

Needs (1) and (2) are met by a moving mechanism that moves the preparation 101 in a plane (XY plane) perpendicular to the optical axis (Z axis) of the objective lens 303. Need (3) is met by a combination of a moving mechanism that moves the preparation 101 in the optical-axis direction (Z-axis direction) of the objective lens 303 and a rotating mechanism that rotates the preparation 101 about two axes (X and Y axes) that are perpendicular to the optical axis. To meet Need (3), a specimen moving stage 108 moves the preparation 101 in the optical-axis direction of the objective lens 303 and rotates the preparation 101 about the two axes perpendicular to the optical axis. The mechanism that meets Needs (1) and (2) may be any of known stage moving mechanisms, and detailed description thereof is therefore omitted herein. The stage 301 includes such a moving mechanism that moves the preparation 101 in the XY plane.

To adjust the focus over the entirety of an area defined by the angle of view, the stage 301 including the specimen moving stage 108 is driven such that the focal plane (a plane at the focal point) of the objective lens 303 conforms to the surface of the specimen to be observed. For example, the shape of the surface of the preparation 101 and the thickness of the cover slip are measured prior to actual imaging, a plane obtained by subtracting the thickness of the cover slip from the shape of the surface of the preparation 101 is assumed to be the surface of the specimen to be observed, and the stage 301 including the specimen moving stage 108 is driven such that the surface of the specimen to be observed conforms to the focal plane of the objective lens 303. The surface of the specimen to be observed may be assumed to be a surface for which the root-mean-square (rms) representing a shape obtained by subtracting the shape of the surface of the preparation 101 from a reference surface is minimized.

The preparation 101 may be brought into focus manually or by a computer on the basis of an actual image of the preparation 101 acquired through the objective lens 303 and the image pickup device 304.

To obtain an image having a high resolution, an objective lens having a high numerical aperture (NA) is necessary. In addition, an illumination system having a relatively high NA, not as high as that of the objective lens, is necessary. To minimize the sizes of an objective lens and an illumination system each having a high NA, the distances from the two to the specimen need to be minimized. In the general embodiment, for such reasons that are specific to microscopes, the specimen moving stage 108 is employed as a stage that is thin enough to be provided in a narrow space between the illumination system 302 and the objective lens 303.

The specimen moving stage 108 will now be described in detail in accordance with several exemplary embodiments.

First Exemplary Embodiment

Figure 2:
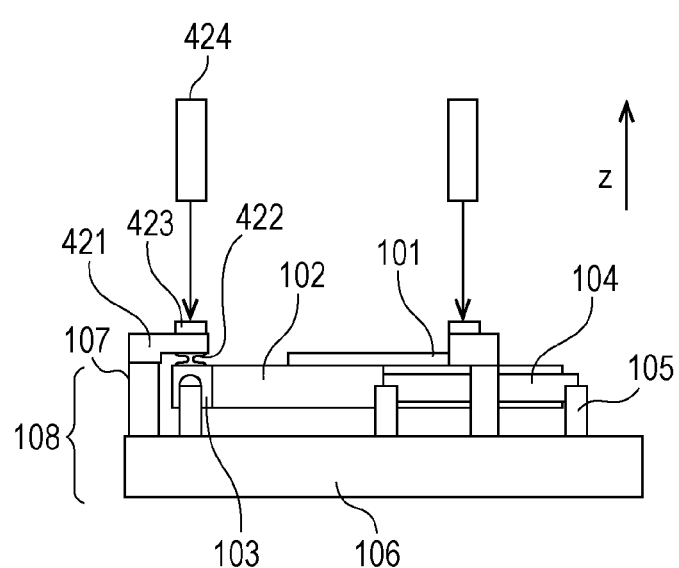
FIG. 2 is a side view of a specimen moving stage according to a first exemplary embodiment of the present invention.
Figure 3:
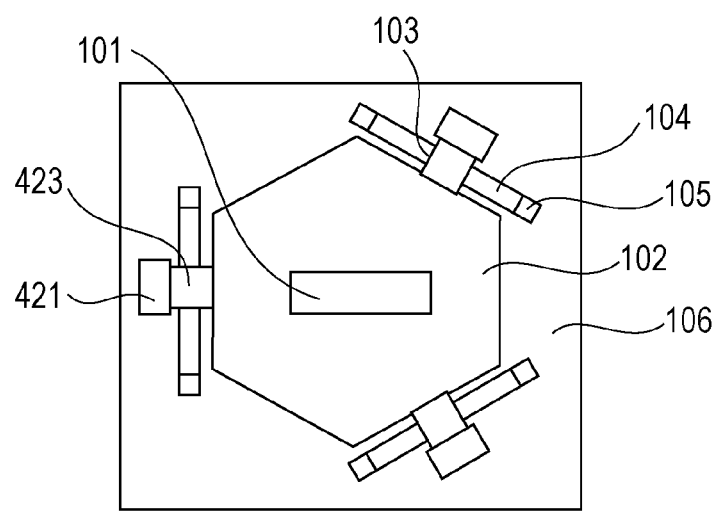
FIG. 3 is a top view of the specimen moving stage according to the first exemplary embodiment of the present invention.

FIG. 2 is a side view of the specimen moving stage 108. FIG. 3 is a top view of the specimen moving stage 108.

Referring to FIGS. 2 and 3, the preparation 101 is placed on a specimen holding member 102. The specimen holding member 102 is connected to supporting members 104 via connecting members 103 included in the specimen holding member 102. The supporting members 104 are connected to projections 105 included in a specimen-moving-stage base (hereinafter simply referred to as base) 106. The projections 105 may be integral portions of the base 106. The projections 105 and the base 106 may be formed together in a mold. Actuators 107 are provided on the base 106.

The base 106 is a fixed member whose position and inclination with respect to the objective lens 303 are fixed. At least one of the position and the inclination of the specimen holding member 102 with respect to the base 106 and thus with respect to the objective lens 303 is changeable by using the actuators 107 provided on the base 106.

As illustrated in FIGS. 2 and 3, the supporting members 104 are each a long bar-like member. The supporting members 104 are stiff in the longitudinal direction thereof and are flexible (relative to the stiffness in the longitudinal direction) in a direction perpendicular to the longitudinal direction thereof. That is, the supporting members 104 has a lower stiffness in the direction orthogonal to the longitudinal direction thereof than in the longitudinal direction thereof. As illustrated in FIG. 3, three supporting members 104 are provided at regular angular intervals around the specimen holding member 102. Hence, the specimen holding member 102 is easy to move along three axes, specifically, easy to move along the optical axis and easy to rotate about two axes that are perpendicular to the optical axis, but is difficult to move along other axes (difficult to rotate about the optical axis and difficult to move along the two axes that are perpendicular to the optical axis).

The supporting members 104 may each have either a round cross section or a rectangular cross section. In a case where any lines for supplying electricity and/or sucking and exhausting air are necessary so as to hold the preparation 101, the supporting members 104 may be hollow members through which those lines extend. Thus, the configuration of the microscope is simplified.

In the first exemplary embodiment, the connections between the specimen holding member 102 (the connecting members 103 included in the specimen holding member 102) and the supporting members 104 and the connections between the base 106 (the projections 105 included in the base 106) and the supporting members 104 reside near corresponding ones of the sides of the specimen holding member 102 as illustrated in FIG. 3. Since the driving mechanism is made up of pieces that are provided near corresponding ones of the sides of the specimen holding member 102, which is the object to be driven, the specimen is movable through a desired stroke even in a narrow space defined between the illumination system 302 and the objective lens 303. Such pieces of the driving mechanism do not block light from the illumination system 302 or light transmitted through the illuminated specimen.

The first exemplary embodiment is characteristic in that each of the actuators 107 and a corresponding one of the connecting members 103 included in the specimen holding member 102 are connected to each other via a buffer mechanism including a leaf spring 422 and in that a target 423 for position measurement is provided on each actuator 107. The buffer mechanism including the leaf spring 422 suppresses the transmission of any changes in the inclination of the specimen holding member 102 that may occur with the driving by the actuator 107 to the actuator 107.

To accurately control the position and the orientation of an object to be driven by an actuator, it is important to measure the current position of the object to be driven. For example, in a case where the current position of an object to be driven is measured externally by using a laser displacement sensor, light from the laser displacement sensor is applied to a target provided on the object to be driven and the reflection from the target is received by a detector, whereby the current position of the object to be driven is calculated. In such a case, if the target inclines, a measurement error may occur. Moreover, even in a case where the object to be driven is intentionally inclined, a measurement error may occur, as described above, if the target is placed directly on the object to be driven.

Accordingly, in the first exemplary embodiment, a buffer mechanism is provided between the specimen holding member 102, which is the object to be driven, and the actuator 107. The target 423 is provided at a location where the position of the target 423 changes uniformly and the inclination of the target 423 does not tend to change while the specimen holding member 102 is driven by the actuator 107. Specifically, the target 423 is provided on an L-angle member 421 that is moved (in the optical-axis direction) by the actuator 107. The L-angle member 421 and the specimen holding member 102 are connected to each other via the buffer mechanism including the leaf spring 422. That is, in the specimen moving stage 108, the target 423 is provided nearer to the actuator 107 (and the L-angle member 421) than the buffer mechanism including the leaf spring 422. The position of the target 423 is measured with a laser displacement sensor 424. The point where the actuator 107 acts on the connecting member 103 via the L-angle member 421, the center of the leaf spring 422, and the center of the supporting member 104 are on a specific line extending in the optical-axis direction.

With the buffer mechanism provided between the specimen holding member 102 and the actuator 107, the center of the supporting member 104 does not shift even if the specimen holding member 102 is driven in such a manner as to incline. Hence, the target 423 moves parallel to the laser displacement sensor 424. Consequently, the change in the position of the target 423 corresponding to the amount of driving by the actuator 107 is measured accurately, and the driving by the actuator 107 is controlled with high accuracy on the basis of the measured value.

The displacement sensor used in measuring the current position of the object to be driven is not limited to a laser displacement sensor and may be, for example, an electrostatic-capacitance displacement sensor, an ultrasonic displacement sensor, an air micrometer, an eddy-current displacement sensor, or the like. Instead of such a non-contact displacement sensor, a contact displacement sensor such as an electrical micrometer may alternatively be used, as long as the electrical micrometer does not affect the operation of the actuator 107. In that case also, the target of measurement only needs to be provided nearer to the actuator 107 than the buffer mechanism. In the microscope, the position and the orientation of the driving mechanism with respect to the objective lens 303 are important. Therefore, the displacement sensor may be provided integrally with the objective lens 303.

Second Exemplary Embodiment

Figure 4:
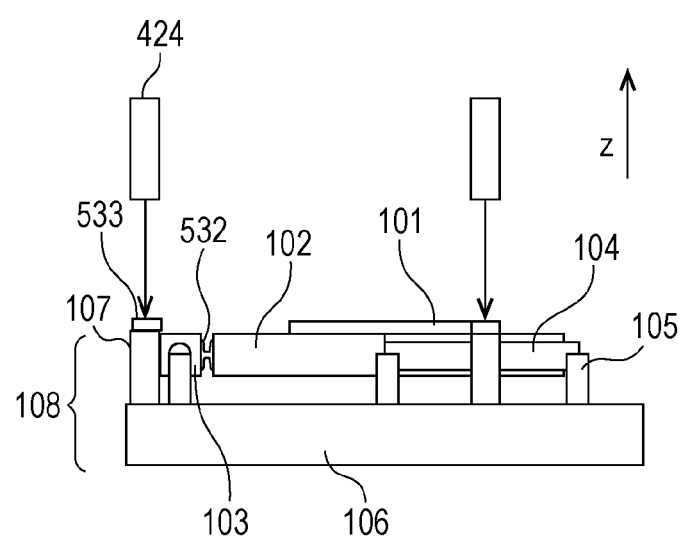
FIG. 4 is a side view of a specimen moving stage according to a second exemplary embodiment of the present invention.

FIG. 4 is a side view of a specimen moving stage 108 according to a second exemplary embodiment of the present invention.

In the second exemplary embodiment, a buffer mechanism including an elastic hinge 532 is provided between each connecting member 103 and the specimen holding member 102. A target 533 is provided directly on each actuator 107. The position of the target 533 is measured with the laser displacement sensor 424 provided above the target 533.

In the second exemplary embodiment also, the target 533 does not incline because of the presence of the buffer mechanism including the elastic hinge 532 even if the specimen holding member 102 is driven by the actuator 107 in such a manner as to incline. Therefore, the position of the target 533 is measured accurately, and the driving by the actuator 107 is controlled with high accuracy on the basis of the measurement.

Third Exemplary Embodiment

Figure 5:
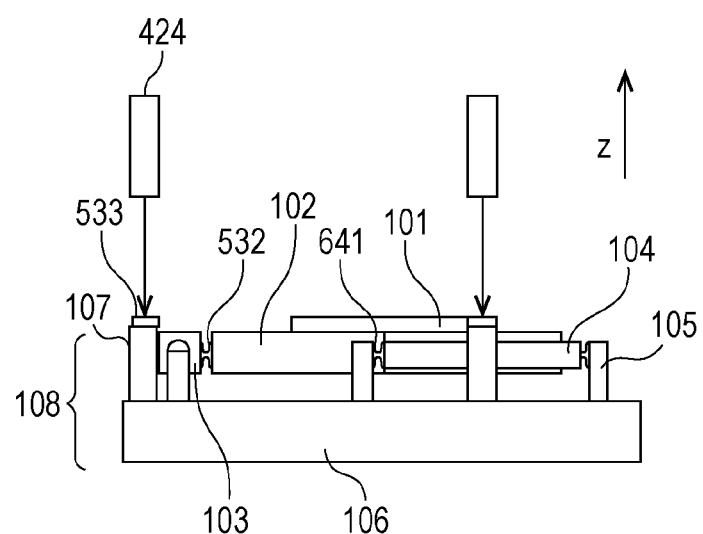
FIG. 5 is a side view of a specimen moving stage according to a third exemplary embodiment of the present invention.

FIG. 5 is a side view of a specimen moving stage 108 according to a third exemplary embodiment of the present invention.

In the third exemplary embodiment, another buffer mechanism including an elastic hinge 641 is added to the configuration according to the second exemplary embodiment. The elastic hinge 641 is provided between each supporting member 104 and a corresponding one of the projections 105. The elastic hinge 641 according to the third exemplary embodiment does not tend to rotate about the longitudinal axis of the supporting member 104.

The presence of the elastic hinge 641 suppresses the rotation of the connecting member 103 due to the disagreement between the point on which the actuator 107 acts and the center of the supporting member 104. Therefore, the position of the target 533 is measured more accurately, and the driving by the actuator 107 is controlled with higher accuracy on the basis of the measurement.

Modifications

Modifications of the first to third exemplary embodiments will be described briefly.

While the base 106 has six projections 105 in each of the exemplary embodiments, the base 106 may have three projections 105. Specifically, each supporting member 104 may be provided with one projection 105.

The supporting member 104 is not necessarily a linear member.

The actuator 107 may be electrically operated or manually operated. For example, the actuator 107 may be a manually operated lead screw, a manually operated ball screw, or a manually operated wedge mechanism.

The leaf spring or the elastic hinge that is taken as an exemplary buffer mechanism in each of the exemplary embodiments may be replaced with a stretchable mechanism having a ring shape or a rectangular ring shape and in which the stiffness in a specific direction is different from the stiffness in another direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-287919 filed Dec. 28, 2011, which is hereby incorporated by reference herein in its entirety.

What is claimed is:

1. A microscope comprising:
   an illumination system that illuminates a specimen;
   a stage on which the specimen is to be placed; and
   an objective lens that forms an image of the specimen illuminated by the illumination system,
   wherein the stage includes:
      a fixed member whose position and inclination with respect to the objective lens are fixed;
      a specimen holding member at least one of whose position and inclination with respect to the fixed member is changeable; and
      a supporting member that supports the specimen holding member with respect to the fixed member,
   wherein a connection between the supporting member and the specimen holding member and a connection between the supporting member and the fixed member reside near sides of the specimen holding member,
   wherein the microscope further includes
      an actuator that drives the specimen holding member such that at least one of the position and the inclination of the specimen holding member with respect to the fixed member is changed; and
      a buffer mechanism that suppresses transmission of any changes in the inclination of the specimen holding member that may occur with the driving by the actuator to the actuator, and
   wherein the actuator and the specimen holding member are connected to each other with the buffer mechanism interposed therebetween.

2. The microscope according to claim 1,
   wherein the supporting member has lower stiffness in a direction orthogonal to a longitudinal direction thereof than in the longitudinal direction thereof, and wherein the supporting member is one of three supporting members that are provided at regular angular intervals around the specimen holding member.

3. The microscope according to claim 1, further comprising:
a target provided at a position of the stage nearer to the actuator than the buffer mechanism; and
a displacement sensor with which any changes in the position of the target that may occur with the driving by the actuator are measured.

4. The microscope according to claim 1, wherein the buffer mechanism is provided at each of the connection between the supporting member and the specimen holding member and the connection between the supporting member and the fixed member.

* * * * *